(12) United States Patent
Sajic

(10) Patent No.: US 12,492,825 B2
(45) Date of Patent: Dec. 9, 2025

(54) PLASTERBOARD LOOKALIKE BUILDING PANEL RADIANT HEATER

(71) Applicant: LaminaHeat Holding Ltd., Leixlip (IE)

(72) Inventor: Peter J. Sajic, County Kildare (IE)

(73) Assignee: Laminaheat Holding Ltd., Kildare (IE)

( * ) Notice: Subject to any disclaimer, the term of this patent is extended or adjusted under 35 U.S.C. 154(b) by 759 days.

(21) Appl. No.: 17/360,380

(22) Filed: Jun. 28, 2021

(65) Prior Publication Data

US 2021/0396396 A1  Dec. 23, 2021

Related U.S. Application Data

(63) Continuation-in-part of application No. PCT/EP2021/066915, filed on Jun. 22, 2021.
(Continued)

(51) Int. Cl.
*F24D 13/02* (2006.01)
*F24D 19/00* (2006.01)
(Continued)

(52) U.S. Cl.
CPC ......... *F24D 13/024* (2013.01); *F24D 19/008* (2013.01); *F24D 19/0276* (2013.01);
(Continued)

(58) Field of Classification Search
CPC .. F24D 13/024; F24D 19/008; F24D 19/0276; F24D 19/062; F24D 19/067;
(Continued)

(56) References Cited

U.S. PATENT DOCUMENTS

| 4,250,398 A | 2/1981 | Ellis et al. |
| 4,310,745 A | 1/1982 | Bender |

(Continued)

FOREIGN PATENT DOCUMENTS

| AT | 11598 U1 | 1/2011 | | |
| CN | 101072530 A | * 11/2007 | ............ | A47J 27/004 |

(Continued)

OTHER PUBLICATIONS

Over definition, https://www.merriam-webster.com/dictionary/over, all pages (Year: 2006).*

(Continued)

*Primary Examiner* — Tiffany T Tran
(74) *Attorney, Agent, or Firm* — Buchanan Ingersoll & Rooney PC

(57) ABSTRACT

A heating panel including a thermally conductive (e.g. metal) layer, a laminar heating element disposed over a framing-facing side of the thermally conductive layer, an insulation layer disposed over the laminar heating element, and a room-facing surface layer disposed over at least the room-facing side of the thermally conductive layer. A method for heating a room may include installing at least one heating panel on a ceiling of the room and providing power to the heating element to generate heat that radiates into the room. The panel may be part of a heating system including a controller, such as a thermostat, for regulating power to the heating panel. A plurality of heating panels or a plurality of heating zones in one or more of the panels may be independently controllable.

25 Claims, 4 Drawing Sheets

Related U.S. Application Data

(60) Provisional application No. 63/042,217, filed on Jun. 22, 2020.

(51) Int. Cl.
*F24D 19/02* (2006.01)
*F24D 19/06* (2006.01)
*F24D 19/10* (2006.01)

(52) U.S. Cl.
CPC ......... *F24D 19/062* (2013.01); *F24D 19/067* (2013.01); *F24D 19/1096* (2013.01); *F24D 2220/042* (2013.01)

(58) Field of Classification Search
CPC ........... F24D 19/1096; F24D 2220/042; F24D 2220/2081; H05B 3/28; H05B 1/0277; H05B 2203/013; H05B 2203/032; H05B 3/262; H05B 3/265; H05B 3/267; Y02B 30/00

See application file for complete search history.

(56) References Cited

U.S. PATENT DOCUMENTS

| | | | | |
|---|---|---|---|---|
| 5,461,213 | A * | 10/1995 | Rodin | G05D 23/1913 219/548 |
| 7,763,134 | B1 * | 7/2010 | Kumar | B32B 13/12 428/317.1 |
| 2010/0116808 | A1 | 5/2010 | Wang | F24D 13/022 29/897.3 |
| 2010/0126978 | A1 * | 5/2010 | Semmes | F24D 19/1096 219/217 |
| 2011/0272392 | A1 * | 11/2011 | Dohring | H05B 3/20 29/592.1 |
| 2012/0187112 | A1 * | 7/2012 | Demol | F24C 7/083 219/649 |
| 2013/0188938 | A1 * | 7/2013 | Dlubak | H05B 3/84 392/360 |
| 2015/0382403 | A1 * | 12/2015 | Philip | H05B 3/12 219/541 |
| 2016/0021704 | A1 * | 1/2016 | Elverud | H05B 3/58 252/502 |
| 2018/0335218 | A1 * | 11/2018 | Ray | H05B 3/34 |
| 2019/0037644 | A1 * | 1/2019 | Kim | H05B 1/0294 |
| 2019/0257598 | A1 * | 8/2019 | Smalc | B32B 9/007 |
| 2019/0346118 | A1 * | 11/2019 | Tischler | G09F 13/22 |
| 2020/0271328 | A1 * | 8/2020 | Hall | H05B 3/845 |

FOREIGN PATENT DOCUMENTS

| | | | |
|---|---|---|---|
| EP | 1213544 A1 | 6/2002 | |
| EP | 2184547 A2 | 5/2010 | |
| GB | 1475285 | 6/1977 | |
| GB | 2493013 A | 1/2013 | |
| JP | H10267307 A | 10/1998 | |
| JP | H11504421 A | 4/1999 | |
| JP | 2002317952 A | 10/2002 | |
| JP | 2003322349 A * | 11/2003 | |
| JP | 2010118341 A | 5/2010 | |
| JP | 2010181056 A | 8/2010 | |
| JP | 2016216967 A | 12/2016 | |
| KR | 20170137008 A | 12/2017 | |
| WO | 9635082 A1 | 11/1996 | |
| WO | WO-2010082130 A1 * | 7/2010 | ............... H05B 3/28 |
| WO | 2011060340 A1 | 5/2011 | |
| WO | 2014122419 A2 | 8/2014 | |
| WO | WO-2016113633 A1 * | 7/2016 | ........... H05B 1/0238 |
| WO | 2019068120 A1 | 4/2019 | |

OTHER PUBLICATIONS

Flush definition, https://www.merriam-webster.com/dictionary/over, p. 3 (Year: 2009).*

International Search Report and Written Opinion for International Application No. PCT/EP2022/067702, mailed Oct. 24, 2022, 15 pages.

International Preliminary Report on Patentability and Written Opinion for International Application No. PCT/EP2021/066915, issued Dec. 13, 2022, 9 pages.

International Search Report and Written Opinion for International Application No. PCT/EP2021/066915, dated Sep. 27, 2021, 12 pages.

Office Action (Notice of Reasons for Rejection) issued Mar. 11, 2025, by the Japanese Patent Office in corresponding Japanese Patent Application No. 2022-579021 and an English translation of the Office Action. (15 pages).

Office Action (Notice of Reasons for Rejection) issued Sep. 9, 2025, by the Japanese Patent Office in corresponding Japanese Patent Application No. 2022-579021. (11 pages).

Office Action (Request for the Submission of an Opinion) issued Sep. 22, 2025, by the Korean Patent Office in corresponding Korean Patent Application No. 10-2023-7002433 and an English translation of the Office Action. (23 pages).

* cited by examiner

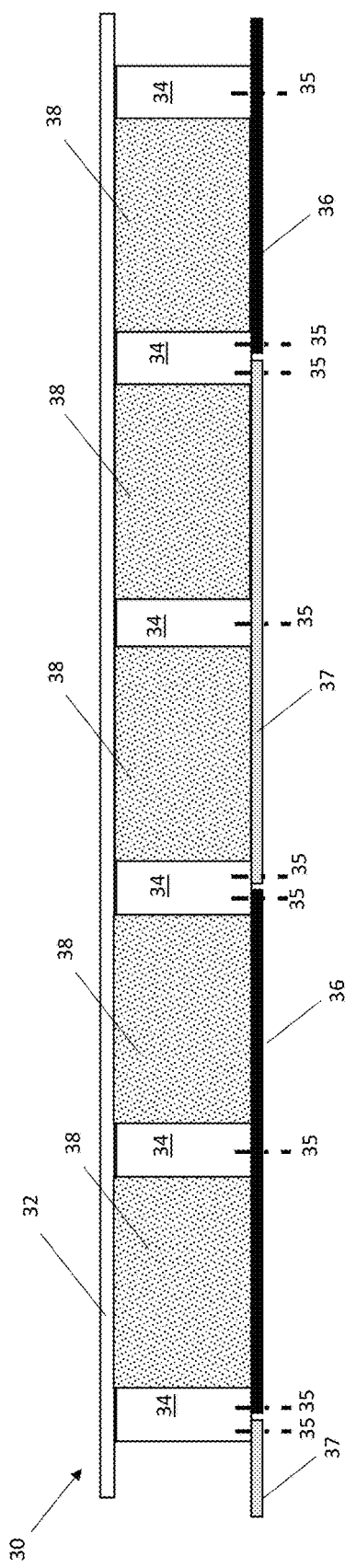
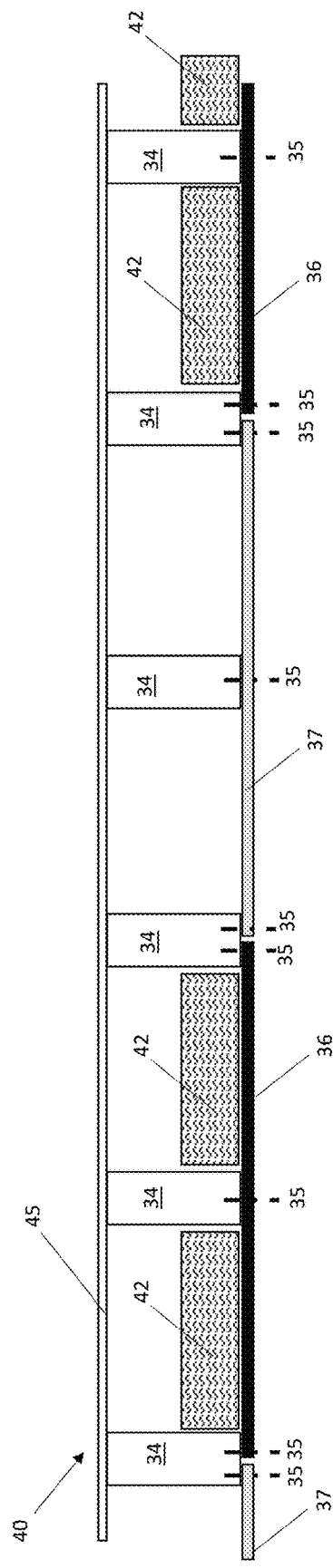
FIG. 3
FIG. 4

PLASTERBOARD LOOKALIKE BUILDING PANEL RADIANT HEATER

CROSS-REFERENCE TO RELATED APPLICATIONS

This application claims priority from U.S. Provisional Application Ser. No. 63/042,217, filed Jun. 22, 2020, and PCT Application Ser. No. PCT/EP2021/066915, filed Jun. 22, 2021, both titled PLASTERBOARD LOOKALIKE BUILDING PANEL RADIANT HEATER, and both incorporated herein by reference.

BACKGROUND OF THE INVENTION

Efficient heating systems for housing that keep the carbon footprint to a minimum are desirable. Modern houses now are well insulated, leading to heating systems that do not require high power capacity. Infrared (IR) radiant heating panels typically use 35-40% less energy compared to conventional convection heating radiators or commonly used underfloor heating.

Placing heating panels on or in the ceiling can provide flexibility in strategically placing the heat where it is desired, with fewer restrictions than with other types of heating units. Standalone IR heating panels may be hung or suspended from an existing ceiling, but are often obtrusive (i.e prominent and noticeable in an unwelcome way) and therefore may not be visually acceptable to the market.

Existing heater applications in the ceiling may be installed behind the ceiling surface panels in the cavity between the ceiling joists in order to be concealed. This can involve using electric cable heater mats or films, wet hydronic pipes, and the like. Typical ceiling constructions comprise surface panels of 12.5 mm thick plasterboard or gypsum wallboard sheetrock, which are usually attached to a structure of wood ceiling joists with drywall screws, and are integrated together into a continuous ceiling appearance by using drywall tape and spackle along the seams between the panels. Such installations are relatively inefficient, resulting in heat transfer of only 70-75% of the input energy as radiating heat into the room, according to test data.

The efficiency of the IR heat radiation is a function of temperature, in which higher temperature produces more efficient radiation. Existing plasterboard or sheetrock panels are typically limited to a surface temp of 55 deg C. or less.

Accordingly, there is a need in the field to provide IR heating that is efficient and aesthetically pleasing.

SUMMARY OF THE INVENTION

One aspect of the invention comprises a heating panel having a framing-facing surface and a room-facing surface. The heating panel comprises a thermally conductive layer having a room-facing side and a framing-facing side, at least one laminar heating element disposed over the framing-facing side of the thermally conductive layer, an insulation layer disposed over the at least one laminar heating element, and a room-facing surface layer disposed over at least the room-facing side of the thermally conductive layer. A power cord is connected to the laminar heating element and configured to connect to a power source.

A protective framing-facing surface layer may be disposed over the insulation layer and may define at least a portion of the framing-facing surface of the panel. In some embodiments, the thermally conductive layer may comprise metal, the protective framing-facing surface layer may comprise a gypsum-reinforced polyester mesh layer bonded to the insulation layer, the insulation layer may comprise foam, and/or the room-facing surface layer may comprise paper. The thermally conductive layer may comprise a tray having peripheral sidewalls. In such configurations, the room-facing surface layer may wrap around the sidewalls of the tray and may define at least a portion of the framing-facing surface of the panels as well as the peripheral edge surfaces of the panels.

The panel may comprise a power cutout switch configured to cutout power to the laminar heating element upon detecting a temperature in the heating panel greater than a predetermined maximum, such as at 80 degrees C. The heating panel may include a plurality of holes extending from a room-facing surface of the panel to a framing-facing surface of the panel, each dimensioned to receive a fastener for fastening the panel to framing of a building. An insulated area may extend between the periphery of the panel and the at least one heating element.

The heating panel may comprise two heating elements and may have an insulated area extending between the two heating elements. An electrical enclosure cutout may be defined in the insulation layer, in which the power cord connects to busbars of the laminar heating element, and may have a cover that is flush with the framing-facing surface of the panel.

Another aspect of the invention comprises a heating system comprising a heating panel as described herein, in which the power cord is connected to a controller, such as a thermostat, for regulating power to the heating panel. A plurality of heating panels or a plurality of heating zones in one or more of the panels may be independently controllable by the controller.

Still another aspect of the invention includes a method for heating a room, comprising installing at least one heating panel as described herein on a ceiling of the room, and providing power to the at least one heating element to generate heat that radiates into the room. A plurality of heating panels may be connected to a thermostat controller mounted in the room, in which the method comprises controlling heat in the room to achieve a set temperature in the room. The ceiling may include at least one heating panel and at least one non-heating panel, wherein installing the at least one ceiling panel comprises applying a plaster material between the at least one heating panel and the at least one non-heating panel to form a continuous coverable ceiling layer.

BRIEF DESCRIPTION OF THE DRAWINGS

FIG. 3 is a schematic illustration of an exemplary installation of a heating panel as described herein on an insulated ceiling.

FIG. 4 is a schematic illustration of an exemplary installation of a heating panel as described herein on an uninsulated ceiling.

DETAILED DESCRIPTION OF THE INVENTION

One aspect of the invention comprises a heating panel capable of producing useful available radiant heat at 90% or more of the input energy. The panel is capable of achieving operating surface temperatures of up to 80 deg C. The panel has the appearance and behaviour of a gypsum or plasterboard panel and is configured to be attached to the ceiling in exactly in the same way as a sheetrock panel. The panel is configured as a "plug-and-play" application in which the heater is configured to be plugged into the available line voltage supply of 110/230 v in the house or building.

A system comprising one or more such ceiling panels may be connected to any standard thermostat to control temperature of the room. Panels may be placed in desirable positions and tailored to maximise the heating requirements of a particular room layout.

Advantages of systems comprising such panels include 90% or more energy conversion to radiant heat directed to the room, which may represent 30-40% energy savings as compared to existing concealed ceiling installations. Additionally, the construction of the ceiling panels permits them to be installed in the same manner as existing insulation boards or sheetrock panels, and the active panel surface may be covered with rendering plaster or any coating similar to plasterboard to permit integration into a continuous surface ceiling suitable for painting or covering with any type of suitable ceiling surface layer. Although the panels may achieve a temperature of 80 deg C., the panels are constructed to meet fire requirements. The plug-and-play connectability simplifies installation and allows flexibility in positioning of the panels wherever they are needed. The overall cost of heating system is competitive with, and may be less expensive, with most or all other technologies on the market.

Figure 1A:
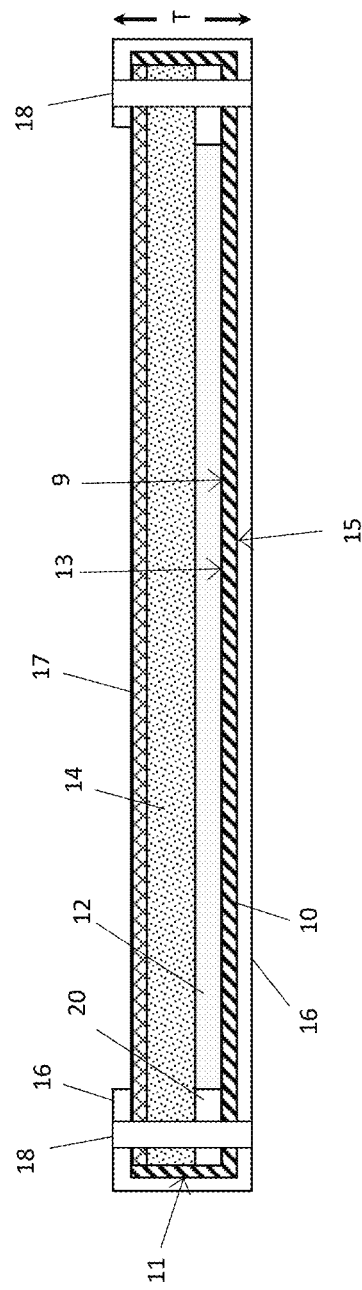
FIG. 1A is a schematic illustration of a cross section of an exemplary heating panel embodiment.

An exemplary heating panel is depicted in FIGS. 1A/1B and 2. The panel comprises a thermal conductive layer 10, preferably in the form of a tray having a bottom 9 and a peripheral sidewall 11. While a tray structure including a sidewall is preferred for structural/aesthetics/edge protection functionality, in other embodiments, the thermal layer may have no sidewall, without a negative impact on thermal performance. In an exemplary embodiment, the tray is formed of a metal (e.g. having a thickness of 0.5 mm in one embodiment), preferably steel, more preferably zinc-plated steel or galvanized steel. Steel is preferred because of low thermal capacity, stiffness, excellent fire/smoke/toxity properties combined with low cost, but the invention is not limited to any particular materials of construction. In particular, other metals that are good thermal conductors, such as but not limited to aluminum and copper may be particularly suitable, and non-metal materials, such as ceramic, carbon-fiber-reinforced, or other conductive fiber polymeric materials, may also be used for the thermal conductive layer. The thermal conductive layer may comprise a multi-layer composite of more than one type of thermal conducting material.

The thermal conductive layer has a framing-facing surface 13 (intended to be installed facing the framing of the ceiling onto which it is attached), and a room-facing surface 15 (intended to be installed facing the room to which the radiant heat is intended to be supplied). A heating film 12, such as a LaminaHeat® ComfortFilm™ or PowerFabric™ heating element, is disposed above the framing-facing surface, and preferably in contact with, the thermally conductive layer. In one embodiment, the laminar heating film may be rated for 160 W at 230 v or 110 v, and may have a power density of 300 W/m2. In a preferred embodiment, a LaminaHeat PowerFabric™ heater, having a thickness of 0.82 mm, in one of the following specifications may be used: 160 W @ 230 v (302 W/m2) or 225 W @230 v (425 W/m2). The heating film may comprise a plurality of layers, as is known in the art, without limitation to any particular construction, thickness, specification, or rating, and is not limited to any particular thickness, although typically may be in a range of 0.7-1.5 mm thick.

An insulation core 14, such as foam, is disposed above the heating film, and may be bonded to the inner sidewalls of the thermally conductive tray. In one embodiment, the foam comprises a rigid polyurethane (PU) foam, preferably in a range of 9-11 mm thick, more preferably 9.5 mm thick, but the invention is not limited to foam insulation or to any particular type of foam or thickness thereof. In general, insulation materials having thermal conductivity values k=0.028-0.035 W/mK and a density of 30-250 kg/m3 are preferred. Additional suitable materials, without limitation, include acrylic and extruded polystyrene (XPS). In one embodiment, the insulation may comprise a vacuum insulated panel (VIP), such as a VIP comprising a silica powder core, commercially known as va-Q-Plus™, supplied by va-Q-tec AG, which delivers a high-end performance k value of 0.0035, which is approximately ten times better than standard foam insulation.

A protective barrier layer 17 may be applied to the framing-facing surface of the insulation core layer. In one embodiment, the protective barrier layer comprises a gypsum-reinforced polyester mesh layer having a thickness of 0.8 mm. A protective surface is preferred on the framing side of the insulation to impose structural stiffness and toughness/protection to the foam, but may be omitted in some embodiments. Reinforced gypsum is compatible with existing building panels used in the building industry. Other materials may also be used, however, including but not limited to a polyester mesh/woven glass fiber open fabric mesh and other fiber-reinforced-polymer coatings or a metal sheet. In one embodiment, the barrier layer may comprise a sheet comprising aluminum or an aluminium alloy (e.g. 2014/HE15, an alloy of aluminum and copper), having a thickness of 1 mm. The layer may be any material and may have any thickness.

Figure 1B:
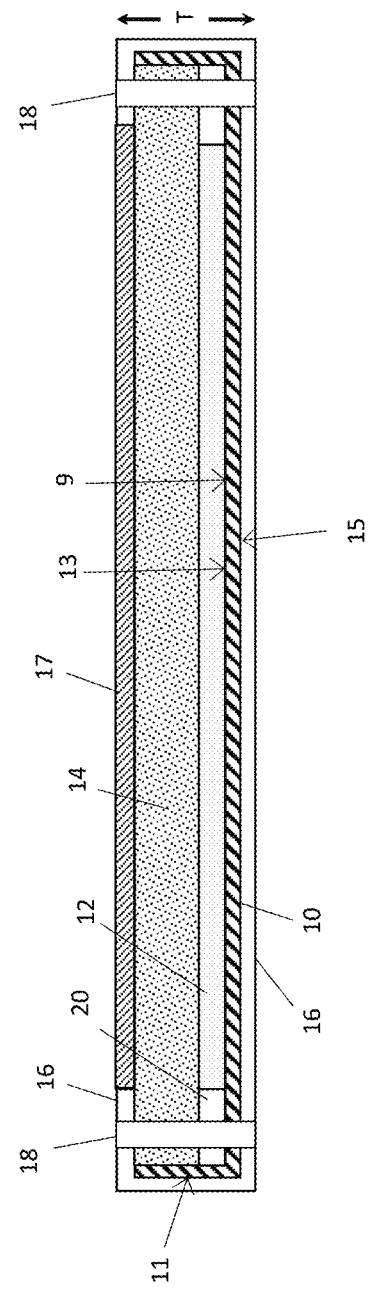
FIG. 1B is a schematic illustration of a cross section of another exemplary heating panel embodiment.

A surface coating 16 (e.g. paper, or a polymeric primer coating, such as epoxy or polyester, which are compatible with paint or gypsum plaster coatings that may be applied as a final decorative finish) is applied to the room-facing surface of the thermally conductive layer, and may wrap around to the side of the panel, and at least over a portion of the framing-facing side of the panel. Paper is preferred as identical to the outer layer provided on standard plaster/gypsum sheetrock panels, but the invention is not limited to any particular surface coating. In some embodiments, other surface coatings may be provided, including any or all of the materials noted above as suitable for the protective barrier layer 17, including in embodiments in which the room-facing surface coating and framing-facing protective barrier layer are the same materials, and embodiments in which the materials are different. As shown in FIG. 1A, the surface coating 16 may extend over a portion of the protective barrier layer 17, or the edges of the surface coating 16 and the protective barrier layer 17 may abut one another, as depicted in FIG. 1B.

A plurality of holes 18 for fixing the panel to the framing may be provided that penetrate from the room-facing surface of the panel to the framing-facing surface of the panel.

Figure 2:
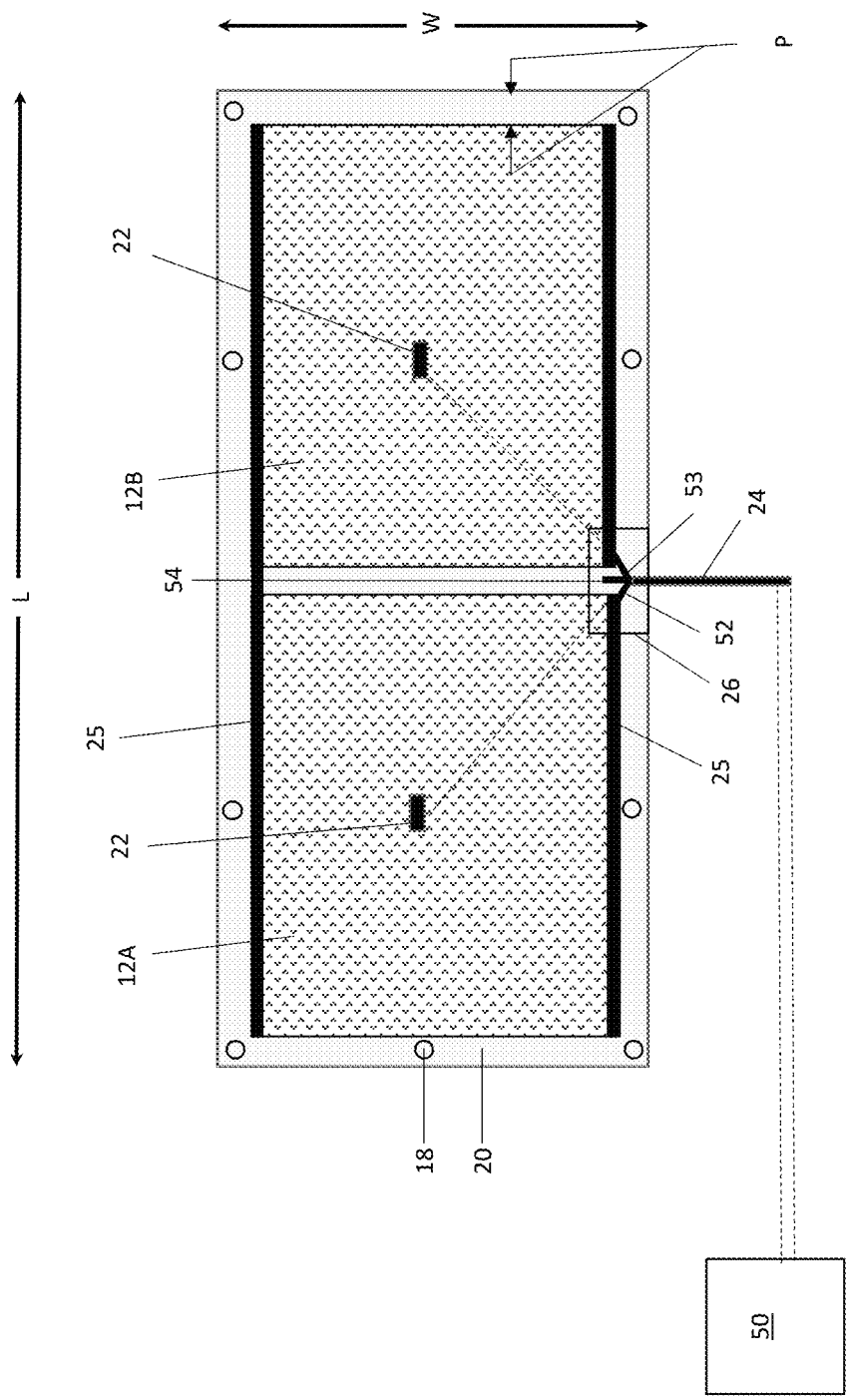
FIG. 2 is a schematic illustration of a partially transparent plan view of an exemplary heating panel embodiment, showing locations of heating elements relative to the periphery of the panel, and a schematic of control and power elements.

As depicted in FIG. 2, the panel may comprise a plurality of heating areas defined by the laminar heating elements, depending upon size of the panel. As depicted in FIG. 2, the panel has two zones 12A and 12B, each surrounded by an insulated perimeter area 20, having a width P, between the lateral edges of the panel and the lateral edges of the laminar heating element. Insulated perimeter area 20 may comprise, for example, a woven glass fiberE (electrical) grade, such as a 200 gsm plain weave construction, but the invention is not limited to any particular materials. Each heating zone may have a thermal protection cutout switch 22 bonded to the heater in a central location. In an exemplary embodiment, the cutout switch may be set to cut off power to the laminar heating element whenever the detected heat exceeds a maximum temperature in a range of 70-80 deg C., preferably 70 deg C. The invention is not limited to any particular cutout maximum, however. Although depicted with two zones, it should be understood that embodiments may have fewer or more than 2 zones (e.g. 1, 3 or 4 zones), and the invention is not limited to a particular number of zones. As depicted in FIG. 2, the panel may have a size of 2 foot×4 foot, but larger or smaller sizes may also be provided, with more or fewer zones. A 4 foot×8 foot panel may, for example, have 4 zones. The number of cutout switches is not dictated by the number or size of the zones. So, for example, embodiments having 1-4 zones in the sizes as discussed above may be provided with 2 cutout switches.

Figure 5A:
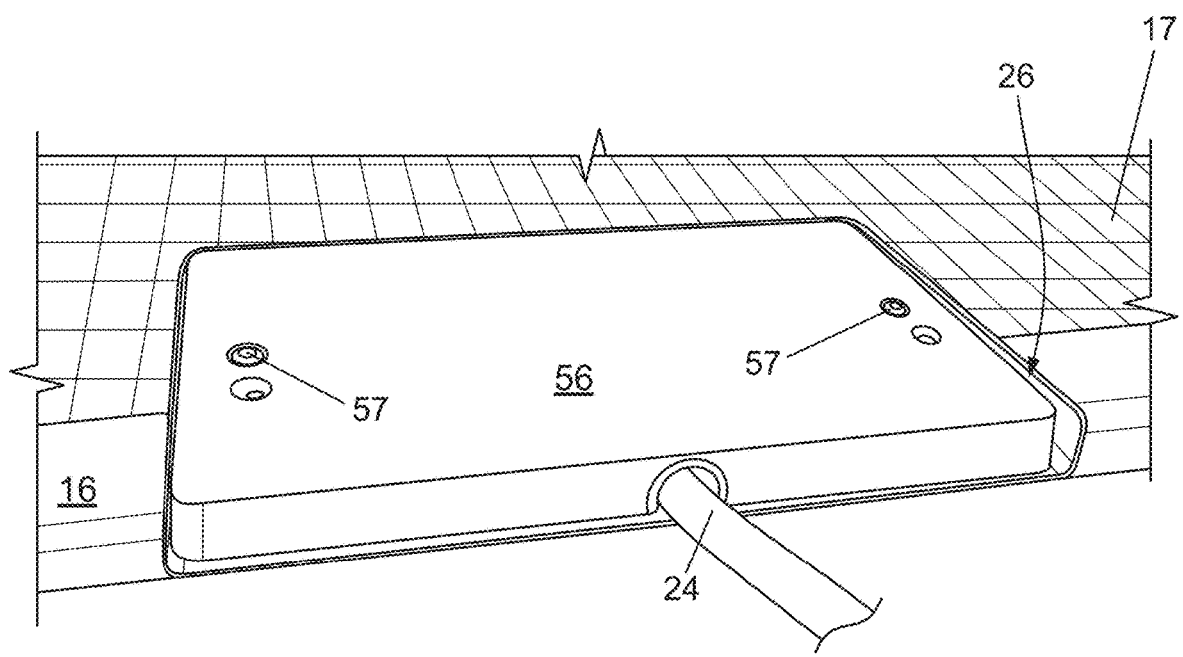
FIG. 5A depicts an exemplary enlarged portion of the framing side of an exemplary panel, showing an enclosure for electrical connections with a closing lid fastened thereto.
Figure 5B:
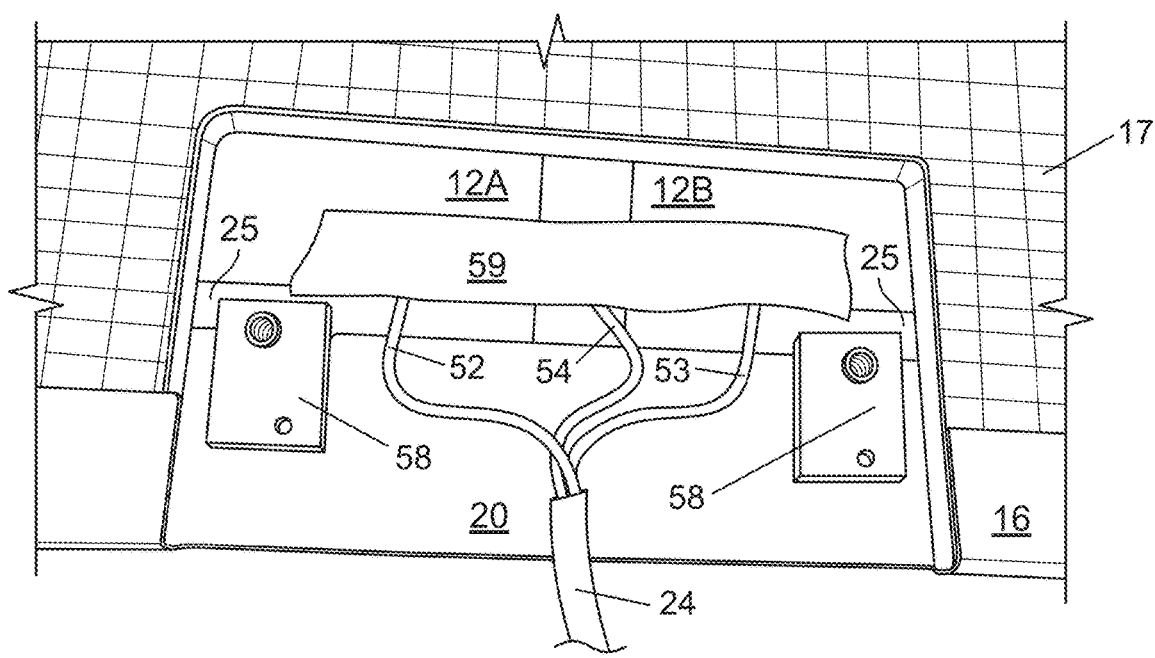
FIG. 5B depicts the portion of the framing side of the exemplary panel as depicted in FIG. 5A, without the lid on the enclosure.

A power input cord 24 is connected to the busbars 25 of the laminar heating units. An electrical connection enclosure 26, such as is depicted in more detail in FIGS. 5A and 5B, surrounds the connection locations, and comprises a cutout within the insulation core layer. In one embodiment, the enclosure may include a plastic (e.g. nylon/PVC blend) electrical cover 56 (e.g. 10 mm thick, but not limited to any particular material or size) that is hollow inside (e.g. the cover defines a top and sidewalls) and is attached to the panel by two fixing screws 57 into corresponding nut plate inserts 58 so that when fastened, the cover is flush with the planar surface of the framing-facing surface of the panel. The nut plate inserts may, for example, be bonded to the heater with high temperature adhesive. The electrical connection enclosure is not visible from the room-facing surface of the panel. In the embodiment depicted in FIGS. 5A-5B, the thermally conductive layer is not in the form of a tray having sidewalls, but in a tray embodiment with sidewalls, the sidewall typically defines the outer edge of the enclosure, thus forming a more continuous peripheral edge in which the cover is not visible from the periphery of the panel.

In an exemplary control scheme, controller 50 is connected to the power cord 24, which may comprise a ground/earth connection 54 (e.g. to the thermally conductive layer) and energized connections 52 and 53 connected to the busbars 25 of heating elements 12A and 12B, respectively. Although shown running between zones in FIG. 2, ground connection 54, which may comprise a copper strip), may run parallel to the long side of a zone of a rectangular single panel unit. The connections may be made by any method known in the art such as with a conductive adhesive. Tape 59 with electrically insulating properties may cover the connections. The energized connections may ultimately connect separately to controller 50 to permit independent control of the zones, or both heating elements may be controllable together. The respective cutout switches are shown connecting to the energized connectors 52, 53, but schematically electrically are interposed between the energized connections and the busbars so that when the cutout switches trip for overheating, no energy is supplied to the heating element. In other embodiments, the cutout switches may be connected back to the controller. The controller may be configured to log and/or create an alarm condition, and produce an audible and/or visible alarm, when the cutout switch has tripped. Embodiments with remote controls may be provided, such as an embodiment in which the controller is connected to an in-home wireless communication network and configured to be controlled by application software on a computer, such as on a phone, tablet, or other mobile device. Alarms may be provided, for example, as notifications to the connected remote device by the controller.

As depicted, in an exemplary embodiment, the full thickness T of the panel may preferably be 12.5 mm, but the thickness is not limited to any particular size, and ideally, panels may be available in any thickness consistent with the corresponding thicknesses of standard sheetrock or plaster panels into which the heating panels are to be intermixed. Similarly, the panels may have any length and width, particularly lengths and widths configured for being inserted in place of a full size piece of plasterboard or sheetrock, such as in at least one embodiment, having a length L of 1200 mm and a width W of 600 mm. In one 1200×600×12.5 mm embodiment, the insulated perimeter area may have a width P of 25 mm.

While one embodiment may comprise characteristics suitable for use as a lookalike to a panel of plasterboard or sheetrock, embodiments are not limited to such constructions. For example, ceiling panels suitable for installation alongside standard drop ceiling tiles may also be formed having some or all of the layers as shown and described. In a ceiling tile embodiment, room-facing layer of the tile may comprise a material other than paper, and/or may have a texture to match non-radiant ceiling tiles within which it may be intermingled to form a cohesive ceiling panel system.

Exemplary laminar heating elements referred to herein may be of the type described in PCT Published Application No. WO 2016/113633 ("the '633 WO Publication), incorporated herein by reference, which is incorporated herein by reference in its entirety. As described therein, the heating element may comprise a plurality of layers including but not limited to outer reinforcing or insulating layers on either or both sides of a resistive heater sheet layer comprising randomly oriented conducting fibers, such as carbon fibers, such as in a non-woven, wet-laid layer of individual unentangled fibers comprising conductive fibers, non-conductive fibers (such as glass fibers), or a combination thereof. In preferred embodiments, the fibers have an average length of less than 12 mm and the fiber layer has an absence of conductive particles. Typical density of this layer may be in a range of 8-60, more preferably in the range of 15-35, grams per square meter. The heater layer preferably has a uniform electrical resistance (in accordance with predetermined industry standards for uniformity) in any direction. The fiber layer may further comprise one or more binder polymers and/or a fire retardant. Each of the conductive fibers and/or each of the non-conductive fibers may have a length in the range of 6-12 mm. One or more of the plurality of conductive fibers may comprise a non-metallic fiber having a metallic coating. The fiber layer may consist essentially of individual unentangled fibers, and may, in particular, be marked by a lack of conductive particles in the fiber matrix The composition of layer 240 is not limited to any particular construction, functional characteristics, or density, however.

The fiber layer, or the heating element as a whole, may also include a plurality of perforations that increase the electrical resistance of the fiber layer relative to a similar layer without such perforations. The fiber layer also includes at least two conductive strips (preferably copper) as busbars. Electrical wires connected to the busbars enable a voltage to be applied to the heater.

Exemplary installations are depicted in FIGS. 3 and 4. FIG. 3 depicts an exemplary insulated ceiling construction 30, in which the ceiling adjoins a floor 32 of an adjacent story of the building. Floor 32 may comprise multiple layers, such as a subfloor and a floor covering (hardwood, carpet, tile, etc., without limitation), as well as other functional layers (underlayment, leveling, etc., without limitation). Joists 34 (e.g. wood of nominal 2×4, 2×6, 2×8 inch construction, steel beams, aluminum framing, etc.) support the adjoining floor, and receive fasteners 35 (e.g. drywall screws, nails, etc.) that fasten the heating panels 36 as described herein as well as regular building panels 37 (e.g. sheetrock). Insulation 38 fills the cavities defined by the joists 34, the floor 32, and the ceiling panels 36, 37. This construction may be particularly useful in a construction for multi-level, multi-family dwellings, in which insulation is provided between adjacent stories for soundproofing and heat containment insulating properties.

FIG. 4 depicts another exemplary ceiling construction 40, in which insulation layers 42 (e.g. 25-30 mm thick mineral wool) abut the heated panels 36, but not the regular drywall panels 37. In exemplary embodiments, the insulation layer 42 may be bonded to the lookalike heated panel to help further contain and direct the heat output of the panels.

It should be noted that the exemplary ceiling constructions are depicted herein as examples only, and that the invention is not limited to any particular construction. Although not shown, the ceiling panels are also ideal for use in suspending ceiling designs, such as are common in commercial environments, in which case the panels may be secured to thin profile steel beams. In the embodiments depicted in FIGS. 3 and 4, additional finishing may be performed, as described above, such as the application of spackling and seaming tape over the seams and further processing to create a ceiling that has an overall planar configuration without visible seams or fastener divots, as is well known in the art. Accordingly, the panel (and thus the corresponding thermally conductive layer) may be shaped to have a planar middle region in a thickest portion of the panel with a slightly beveled periphery angled from the middle region to the edges of the panel, which may have a slightly lesser thickness than the middle region. This slight beveling may be helpful for accommodating the seaming tape and spackling to cover the seams and create a substantially planar ceiling (within standard tolerances from planar as are well understood by those of skill in the art of drywall finishing). Such a substantially planar ceiling comprises a continuous coverable ceiling layer (e.g. suitable for painting or applying further coverings without visible seams between the building panels (including heating panels and regular building panels).

In addition to the superior thermal performance of the plasterboard lookalike radiant heating panel, another advantage includes the plug-and-play simplicity that permits the heating panels to be connected to existing or new power cables in the ceiling quite easily.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A heating panel having a framing-facing surface and a room-facing surface, the heating panel comprising:
   a thermally conductive layer having a room-facing side and a framing-facing side, wherein the thermally conductive layer comprises a tray having peripheral sidewalls, and wherein the thermally conductive layer comprises zinc-plated steel or galvanized steel;
   at least one laminar heating element disposed over the framing-facing side of the thermally conductive layer;
   an insulation layer disposed over the at least one laminar heating element;
   a primarily room-facing surface layer applied to at least the room-facing side of the thermally conductive layer, wherein the primarily-room-facing surface layer wraps around the peripheral sidewalls of the tray and defines at least a peripheral portion of the framing-facing surface of the heating panel; and
   a power cord connected to the laminar heating element and configured to connect to a power source.

2. The heating panel of claim 1, further comprising a protective framing-facing surface layer disposed over the insulation layer and defining at least a portion of the framing-facing surface of the heating panel.

3. The heating panel of claim 2, wherein the protective framing-facing surface layer comprises a gypsum-reinforced polyester mesh layer bonded to the insulation layer.

4. The heating panel of claim 2, wherein the protective framing-facing surface layer comprises metal.

5. The heating panel of claim 2, wherein the peripheral portion of the framing-facing surface of the heating panel defined by the primarily room-facing surface layer defines an edge that abuts an adjacent edge of the protective framing-facing surface layer.

6. The heating panel of claim 2, wherein the peripheral portion of the framing-facing surface of the heating panel defined by the primarily room-facing surface layer extends over a portion of the protective framing-facing surface layer.

7. The heating panel of claim 1, wherein the insulation layer comprises foam.

8. The heating panel of claim 1, wherein the primarily-room-facing surface layer comprises paper.

9. The heating panel of claim 1, wherein the primarily-room-facing surface layer comprises a polymeric coating.

10. The heating panel of claim 1, further comprising a power cutout switch configured to cutout power to the laminar heating element upon detecting a temperature in the heating panel greater than a predetermined maximum.

11. The heating panel of claim 10, wherein the predetermined maximum is in a range of 70-80 degrees C.

12. The heating panel of claim 1, further comprising a plurality of holes extending from the room-facing surface of the heating panel to the framing-facing surface of the heating panel, the plurality of holes dimensioned to receive a fastener for fastening the heating panel to framing of a building.

13. The heating panel of claim 12, wherein each of the plurality of holes extends through the peripheral portion of the framing-facing surface of the heating panel.

14. The heating panel of claim 1, comprising an insulated area extending between a periphery of the heating panel and the at least one heating element.

15. The heating panel of claim 1, comprising two heating elements.

16. The heating panel of claim 15, further comprising an insulated area extending between the two heating elements.

17. The heating panel of claim 1, further comprising an electrical enclosure cutout defined in the insulation layer, wherein the power cord connects to busbars of the laminar heating element within the electrical enclosure, and the electrical enclosure includes a cover that is flush with the framing-facing surface of the heating panel.

18. A heating system, comprising a heating panel of claim 1, wherein the power cord is connected to a controller for regulating power to the heating panel.

19. The heating system of claim 18, wherein the controller comprises a thermostat.

20. The heating system of claim 18, comprising a plurality of heating panels or a plurality of heating zones in one or more of the heating panels, wherein one or more of the heating panels or heating zones is independently controllable by the controller.

21. A method for heating a room, comprising the steps of:
   a) installing at least one heating panel on a ceiling of the room, the heating panel having a framing-facing surface and a room-facing surface, the heating panel comprising:
      a thermally conductive layer having a room-facing side and a framing-facing side, wherein the thermally conductive layer comprises a tray having peripheral sidewalls, and wherein the thermally conductive layer comprises zinc-plated steel or galvanized steel;
      at least one laminar heating element disposed over the framing-facing side of the thermally conductive layer;
      an insulation layer disposed over the at least one laminar heating element;
      a primarily room-facing surface layer applied to at least the room-facing side of the thermally conductive layer, wherein the primarily-room-facing surface layer wraps around the peripheral sidewalls of the tray and defines at least a peripheral portion of the framing-facing surface of the heating panel; and
      a power cord connected to the laminar heating element and configured to connect to a power source; and
   b) providing power to the at least one heating element to generate heat that radiates into the room.

22. The method of claim 21, further comprising connecting a plurality of heating panels to a thermostat controller mounted in the room and controlling heat in the room to achieve a set temperature in the room.

23. The method of claim 21, wherein the ceiling comprises at least one heating panel and at least one non-heating panel, wherein installing the at least one ceiling panel comprises applying a plaster material between the at least one heating panel and the at least one non-heating panel to form a continuous coverable ceiling layer.

24. The heating panel of claim 1, wherein the heating panel comprises a planar middle region in a thickest portion of the heating panel and a bevelled periphery angled from the middle region to edges of the heating panel, the edges having a lesser thickness than the thickness of the middle region.

25. A heating panel having a framing-facing surface and a room-facing surface, the heating panel comprising:
   a thermally conductive layer having a room-facing side and a framing-facing side, wherein the thermally conductive layer comprises a tray having peripheral sidewalls, and wherein the thermally conductive layer comprises steel;
   at least one laminar heating element disposed over the framing-facing side of the thermally conductive layer, the laminar heating element comprising a resistive sheet comprising randomly oriented carbon fibers in a non-woven, wet-laid layer and having at least two conductive busbars;
   an insulation layer disposed over the at least one laminar heating element;
   a protective framing-facing surface layer disposed over the insulation layer and defining at least an inner portion of the framing-facing surface of the heating panel;
   a primarily-room-facing surface layer comprising a paper or polymeric coating applied to at least the room-facing side of the thermally conductive layer, wherein the paper or polymeric coating wraps around the peripheral sidewalls of the tray and defines at least a peripheral portion of the framing-facing surface of the heating panel;
   a power cord connected to the laminar heating element and configured to connect to a power source;
   a plurality of holes extending from the room-facing surface of the heating panel to the framing-facing surface of the heating panel through the peripheral portion of the framing-facing surface layer defined by the paper or polymeric coating, the plurality of holes dimensioned to receive a fastener for fastening the heating panel to framing of a building; and
   an electrical enclosure cutout defined in the insulation layer, wherein the power cord connects to the at least two busbars of the laminar heating element within the electrical enclosure, and the electrical enclosure includes a cover arranged flush with the framing-facing surface of the heating panel.

\* \* \* \* \*